United States Patent Office 3,169,917
Patented Feb. 16, 1965

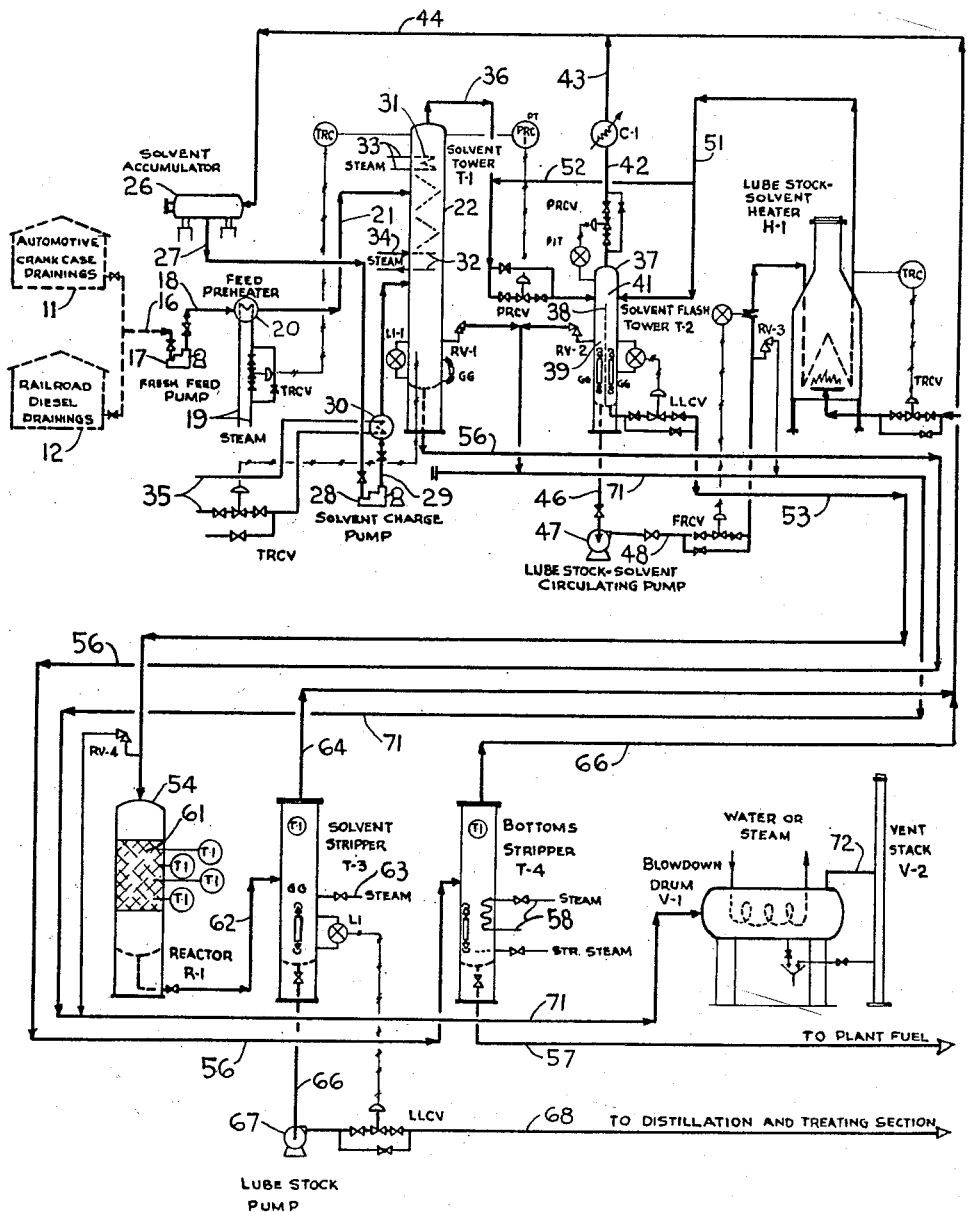

3,169,917
PROCESS FOR REMOVING ENGINE PRODUCED CONTAMINANTS FROM USED LUBRICATING OIL
Ulrich L. Kahan, Oakland, Calif., assignor to Ulrich Process Company, Inc., a corporation of California
Filed July 24, 1961, Ser. No. 126,136
2 Claims. (Cl. 208—180)

The invention relates to processes for reclaiming crank case lube oil drainings of internal combustion engines.

Lubricating oil films deposited on the cylinder walls of internal combustion engines and under certain other conditions are subjected to very high temperatures and pressures which cause "cracking" of the oil and the production of heavy polymers and relatively lighter components. These components are no longer lubricants but return to the crankcase as contaminants which dirty and dilute the oil. The heavier components are generally characterized as cyclic, hydrogen poor, oxygenated products and are sometimes referred to as asphaltenes, lacquers, varnishes, and oxidized hydrocarbons. Other engine produced contaminants are derived from the decomposition products of the oil additives in common use including antioxidants, deactivators, detergents, viscosity index improvers, polar organic rust inhibitors, and pour point depressants. Antioxidant groups that are prevalent in modern lubricating oils include: (a) hydroxy compounds, (b) nitrogen compounds, (c) sulfur compounds, (d) organo-metallic compounds, (e) compounds of halogens, and (f) compounds involving elements of Group VI of the Periodic Table. The most common metal deactivators are the diamines. They are used principally to protect the liquid from the peroxidant action of soluble copper compounds. Detergents include carboxylate soaps and the metallic sulfonates; alkali and alkaline earth aryl stearates; metal sulfonates; dinonyl naphthalene (salts) sulfonates of Li, Na, Cs, N Hy, Mg, Ca, Ba, Cu, Al and H. Viscosity improver compounds prevalent in modern lubricating oils are polymer-thickened petroleum oils prepared from petroleum oils that are more volatile than a non-additive oil. These viscosity index improvers are mainly polybutenes, polymethacrylate esters, vinyl-type polymers, copolymers of alkyl methacrylates, and dialkylaminoalkyl methacrylates. Rust inhibitors are the carboxylic acids (naphthenic acids) and the sulfonic acids (petroleum sulfonic acids) with fatty acids, also synthetic sulfonic acids from polyalkylated aromatics derived from benzene and naphthalene. The most commonly used rust inhibitors are: (a) organic acids of high molecular weight, (b) the salts of such acids, and (c) the materials formed on neutralizing these acids with organic basis such as the substituted amines. The following classes of compounds are widely used as polar rust inhibitors: (a) alkali and alkaline earth soaps of naphthenic and sulfonic acids from petroleum and related synthetic substances, such as the arylstearic and alkylnaphthalene sulfonic acids; (b) oleates, naphthenates, and the various $C^8$–$C^{18}$ normal fatty acid soaps of the heavy metals, including copper, zinc, iron, nickel and cobalt; (c) aluminum soaps are oleic, II-ethylhexanoic, naphthenic, and $C^8$–$C^{18}$ normal fatty acids; (d) quaternary ammonium salts of a suitable cation with an anion of relatively small volume; (e) alkali and alkaline earth alkylphenolates, and alkylphosphates; and nonionic surface active substances such as hexanolamine oleate, nonaethylene glycol monolaurate, mono-oleate, and certain alkyl resins. The prominent pour point depressants are: Friedel-Crafts condensation products of paraffin wax and naphthalene; Friedel-Crafts condensation product of phenol and wax which is further condensed with phthalyl chloride or similar compounds and polymers of methacrylic acid esters of higher alcohols.

Still other contaminants which find their way into the lubricating oil, engine produced and otherwise, are water and solids such as dirt, metallic particles, carbonaceous matter, colloids, such as metallic soaps and oxides. Heretofore, the only commonly accepted commercial procedure for reclaiming used crankcase lubricating oil drainings has been to dehydrate, sulphuric acid treat, and hot clay contact the oil. This former procedure while effective has certain disadvantages and adherent problems such as acute plant equipment corrosion, acid sludge disposal, release of noxious fumes and air pollution, cost of consumed chemicals such as acid and fuel for dehydration and relatively low recoveries of specification lube oil.

An object of the present invention is to provide a process for removing from used lubricating oil contaminants of the character above described including the products of cracking and polymerization of the oil and the decomposition products of the oil additives and which will yield appreciably higher recoveries of high viscosity, odor free, lubricating oils then heretofore obtainable and with lower plant capital investment and operating cost.

Another object of the present invention is to provide a process of the character described which is of a continuous flow type capable of large and continuous output for indefinitely long process cycles.

Another object is to provide a process capable of precise process and product control yet has the desired flexibility with respect to charge stocks and products.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

The sole figure is a schematic drawing of a plant layout for practicing the process of the present invention.

I have found that I can remove all or nearly all of the aforementioned contaminants from the crankcase lubricating oil drainings by treating the used oil with a specially selected solvent composed of approximately 90% propane, about 8% butane, and about 2% ammonia, all parts taken by volume and with the solvent under pressure in a liquid state. This treatment is preferably effected in a solvent tower T–1 into which the crankcase drainings and solvent under pressure may be fed. When the oil and solvent are thus brought together, the oil dissolves in the solvent and the aforementioned oil soluble contaminants unexpectedly come out of solution and form a precipitate in the lower section of the tower. A phase separation thus occurs in the tower. The upper phase changes from brown to straw color as the contaminants precipitate out of the oil and the bottom phase darkens as these precipitates move into the lower phase.

Another action which takes place in the solvent tower is the breaking up of the water emulsion in the oil. This occurs as the solvent removes the mineral phase of the emulsion leaving the water droplets to coalesce and precipitate. Similarly the solvent removes the mineral phase of the detergent present and precipitates the water of hydration contained in the detergent and the metalloorganic compounds. In the case of the antioxidants the solubilization of the hydrocarbon phase takes place by the solvent thus disassociating this hydrocarbon phase from the antioxidant compound. In so doing the hydrocarbon phase is solubilized into the solvent and lube oil stream whereas the deteriorated sensitive portion of the antioxidant groups containing the bulk of the heavier metallo-organic compounds are precipitated to the bottom of the tower and thus removed from the lube oil going overhead with the solvent. The solubilization of the hydrocarbon phase of the viscosity index improvers, the polar organic rust inhibitors, and the pour point depressants effects a similar phasing out of the deteriorated sensitive portion of these oil additives and their precipitation to the bottom of the tower.

While nearly all of the heavier engine produced contaminants can thus be removed from the lubricating oil by making the solvent tower large enough, I have found another very effective means, viz., activated bauxite, for removing minor quantities of these contaminants. The two processes work ideally together in that the use of the second contaminant removal step through the activated bauxite enables the reduction in size and capacity of the solvent tower to a most convenient and economic size. Accordingly, I prefer to extract approximately 90 percent of the contaminants in the solvent tower and approximately 10 percent in the activated bauxite reactor. This relative balance permits the use of conveniently sized and economically produced units.

Various minor variations in the basic propane solvent may be adapted. For example, the percentage of propane may be as high as 100 percent. One of the purposes of the butane is to lower the vapor pressure of the solvent and to inhibit the action of the propane. Normally the butane would not be used in excess of 10 percent. The ammonia is used principally as a decolorizing agent and may be present in the blend up to about 10 percent. The preferred blend may be stated as being composed of at least 90 percent propane and a maximum of 10 percent butane and ammonia. All of the foregoing percentages are by volume. The foregoing is most effective in the separation out of the crankcase drainings of the dissolved contaminants and the phase separation of these heavier components as above explained, as well as the phasing out of all of the water, colloidal carbon, suspended solids and all matter not forming a true solution with the oil.

With reference to the accompanying drawing, crankcase drainings are stored in tanks 11 and 12 which may be segregated as to automotive crankcase drainings and railroad diesel drainings, etc. These tanks are connected by a series of pipes and valves permitting the selective removal of any of the drainings or combinations thereof from the tanks to an outlet pipe 16 which is connected to the intake side of a motor driven pump 17. The discharge side of the pump is connected by pipe 18 to a heat exchanger 20 from which heated drainings are pumped by pipe 21 to an inlet near the top of casing 22 forming solvent tower T–1. Steam lines 23 may be connected to heat exchanger 20 for heating the crankcase drainings flowing therethrough.

Solvent is stored in a pressure tank 26 from which solvent is withdrawn through pipe 27, motor driven pump 28 and pipe 29 for delivery to a solvent inlet on the side of casing 22 somewhat below the crankcase drainings inlet. Preferably a heat exchanger 30 is inserted in pipeline 29 for preheating the solvent, the heat exchanger being here fed by steam lines 35. The introduction of the solvent into the tower T–1 below the point of introduction of the feed drainings produces a counterflow within the column with the solvent flowing up through the crankcase drainings and the latter flowing downwardly through the incoming solvent. The treating and settling temperatures are of some importance. Regulation of the desired treating temperatures attain through the control of the inlet temperature of the feed stock, viz., the crankcase drainings, the amount and temperature of the solvent re-cycle and the steam provided in a series of steam coils 31 and 32 provided in the top section of the tower T–1. As will be observed from the drawing these steam heating coils are mounted within casing 22 and are connected by steam lines 33 and 34.

The treating temperature is preferably maintained between about 100° F. and about 170° F. As the temperature is increased within this range progressively more hydrocarbons are rejected in the mixture leaving the bottom of the tower.

Another variable in the process is the solvent re-cycle to feed ratio. Generally stated practically all crankcase drainings stocks can be treated by the process of the present invention by using a solvent re-cycle to feed stock ratio of about five to one, provided the proper temperatures are maintained in the treating tower. The character of the feed stock will vary considerably. Some feed stocks are easily treated at low solvent to feed ratios and others require much higher ratios. Adjustment of the solvent re-cycle to feed ratio may also be used to maintain proper treating temperature above mentioned; but essentially it is used to control the quality of the desired raffinate product being produced from the top of the tower. A higher solvent to feed ratio generally gives a better separation, thus yielding a more desirable lube oil product and better color. Generally a ratio of drainings to solvent mixture ratio may vary from about 1 to 1 to about 1 to 20.

The pressure maintained in the treating tower is of secondary importance so long as it is sufficiently high to maintain the solvent in a liquid state. Generally, a pressure of about 400 to 600 lbs. per square inch gauge is sufficient.

The second step in the process is to separate out the solvent from the solvent and oil solution taken from the top of the solvent tower T–1 through pipe 36. This is accomplished by flash vaporization in a solvent flash tower T–2 to which pipe 36 is connected. This tower consists of a vertical vessel 37 which is divided by a vertical baffle 38 into a flash section 39 and a product section 41. Solvent is separated from the oil solvent solution and passes out of the upper end of the vessel through pipe 42 to a condenser C–1 from where liquid solvent returns to the accumulator through pipes 43 and 44.

Material from the flash section 39 is taken from the vessel by pipe 46 which is connected to the intake side of a motor driven pump 47 which delivers the oil through pipe 48 to a lube oil solvent heater H–1. The flow from the outlet of heater H–1 is split; part of the flow is returned to the product section 41 of the solvent flash tower T–2 via pipe 51; and part is returned via pipes 51 and 52 to the outlet pipe 36 of the solvent tower T–1. The oil (without solvent) is taken from the product side of the solvent flash tower T–2 by pipe 53 and is led to the top of housing 54 providing the catalytic reactor R–1.

A first valuable byproduct is obtained from the present process, viz., a plant fuel, from the bottoms of solvent tower T–1. This heavy material is pressured out through pipe 56 to a steam stripper T–4. Solvent is taken off from the stripper by pipe 66 for re-use. The bottoms are taken from stripper T–4 and pressured or pumped via pipe 57 to a plant fuel oil storage tank. Bottoms stripper T–4 is heated by steam lines 58.

Solvent flash tower T–2 mentioned above is maintained at a temperature of about 250° F. to 500° F. and a pressure of about 250–350 lbs. per square inch gauge.

The final removal of undesirable constituents in the solvent treated lubricating oils is accomplished in reactor R–1. The temperature in the reactor R–1 may range from 350° F. to about 700° F. and the pressure may range from 0 to 50 lbs. per square inch gauge with a preferred operating pressure of about 20 lbs. per square inch gauge. The specific catalyst selected for this process is an activated bauxite which can be purchased commercially and is sold under the trade name Porocel. The Porocel used in the process has a typical composition as follows:

$Al_2O_3$—81.5%, $Fe_2O_3$—3.0%, $TiO_2$—3.5%, $SiO_2$—10.5%, insolubles 1.5%

The size of this catalyst should be within a range of 10–20 mesh (by Tyler screen). The space velocity of solution to catalyst for reactor R–1 may be approximately 1:2 v./v./hr.

I have found that activated bauxite is capable of adsorbing all but traces of the heavy bodied engine producing contaminants found in the lubricating oil. The activated bauxite is mounted as a catalytic bed 61 in housing 54 and the oil product to be treated is fed over the top of the bed for flow therethrough as generally illustrated in the drawing. This arrangement allows for long "on stream" periods for a given reactor before steam and air regeneration is necessary. As long as thirty day runs can be expected before regeneration is required. The downflow passage of the heated oil courses through the catalyst bed at about 20 lbs. per square inch insuring substantially complete removal of the contaminants above referred to. Steam and air regeneration will restore the catalyst to fully activity. This regeneration of the catalyst is accomplished by controlled burning of the carbonaceous matter which is deposited on the catalyst during the process cycle. This regeneration is carried out with the aid of a properly pre-heated steam and air mixture.

The final step in the process is the removal of all of the solvent from what may be denominated the "third" solution removed from the reactor R-1. As will be observed this solution is taken from the bottom of housing 54 by pipe 62 and led to a solvent stripper T-3 where the remaining solvent in the oil is removed by stripping with steam introduced by steam line 63. The solvent thus removed is taken from the top of the stripper by pipe 64 which is here shown connected to pipe 44 for return of the solvent to the accumulator 26. The stripped lube oil stock is taken from the bottom of the stripper by pipe 66 which connects with motor driven pump 67 for discharge through pipe 8. The lube oil stock is then delivered to a conventional distillation apparatus for separating off what may be termed "crankcase dilution" which falls generally within a boiling range of about 400° F. to 600° F. The oil is then further clay treated and filtered to produce the final specification oil.

Preferably the two high pressure towers T-1 and T-2 are protected with a high pressure relief line 71 which is appropriately connected to casings 22 and 37 by relief valves RV-1 and RV-2 and which lead to blow down drum V-1, and the latter is connected by pipe 72 to a vent stack V-2. Heating and cooling coils are provided within drum V-1 as indicated.

Typical product yields provided by the process of the present invention as contrasted to the conventional acid and clay process using automotive crankcase drainings are as follows:

| Charge | Process of Present Invention, Vol Percent | Commonly Used Thermal Dehydration Sulphuric Acid and Hot Clay Treating, Vol. Percent |
|---|---|---|
| Used motor oil automotive crankcase drainings | 100.00 | 100.00 |
| Yields: | | |
| Water | 1.65 | 1.65 |
| Crankcase dilution | 8.10 | 8.10 |
| Cracked products (lighter than lube oil) | 0.00 | 5.25 |
| Specification lube oil | 87.85 | 69.50 |
| Bottoms (as plant fuel oil) | 1.40 | 0.00 |
| Acid sludge (loss) | 0.00 | 15.00 |
| Loss (from deodorizing and to clay) | 1.00 | 0.50 |
| | 100.00 | 100.00 |

Of the foregoing product yield both crankcase dilution and bottoms are valuable saleable by-products.

The comparative product yields using railroad diesel engine drainings are substantially as follows:

| Charge | Process of Present Invention, Vol Percent | Commonly Used Thermal Dehydration Sulphuric Acid and Hot Clay Treating, Vol. Percent |
|---|---|---|
| Used railroad diesel engine oil | 100.00 | 100.00 |
| Yields: | | |
| Water | 0.80 | 0.80 |
| Crancase dilution | 2.00 | 2.00 |
| Cracked products (lighter than lube oil) | 0.00 | 6.75 |
| Specification lube oil | 90.70 | 73.20 |
| Bottoms (as plant fuel oil) | 5.50 | 0.00 |
| Acid sludge (loss) | 0.00 | 16.75 |
| Loss (from deodorizing and to clay) | 1.00 | 0.50 |
| | 100.00 | 100.00 |

Aside from the significantly higher recovery of specification lube oil, the process of the present invention provides a continuous high production yield of lube oil of highest quality and extreme stability which is odor free, has a low metal and ash content, and meets the strictest applicable industrial standards and API, ASTM, and MIL specifications. The adoption of the process of the present invention is greatly in the public interest in the elimination of the serious problems of air and soil and water pollution inherent in the conventional, widely practiced acid treatment for re-claiming used oils.

Other piping, valves and controls shown on the drawing will be self-explanatory. As an aid to understanding, a legend of symbols used is as follows:

LEGEND OF SYMBOLS

 TEMPERATURE RECORDING CONTROLLER

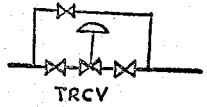 TEMPERATURE CONTROL LOOP
TRCV

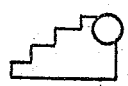 POSITIVE DISPLACEMENT MOTOR DRIVEN PUMP

 CENTRIFUGAL MOTOR DRIVEN PUMP

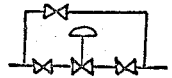 FLOW CONTROL LOOP

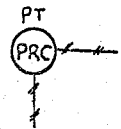 PRESSURE RECORDER CONTROLLER AND PRESSURE TRANSMITTER

 CONDENSER

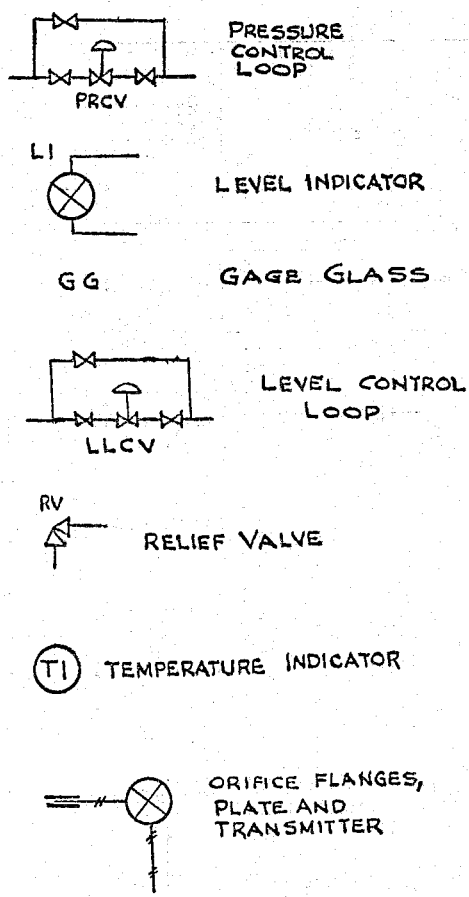

I claim:
1. The process of removing from used lubricating oil drainings contaminants of the class consisting of the products of cracking and polymerization of the oil and the decomposition products of oil additives including anti oxidants, deactivators, detergents, viscosity index improvers, polar organic rust inhibitors, and pour point depressants which consist of:
(1) obtaining a first solution by admixing said drainings with a specific solvent, composed of about 90% propane by volume, about 8% butane by volume, about 2% ammonia by volume, the ratio of drainings to solvent mixture being about 1:1 to 1:20 for removing from said lubricating oil by precipitation about 90% of said contaminants, said drainings and solvent being heated to a temperature of about 100° F. to 170° F. and under a pressure of about 400 to 600 pounds per square inch gauge;
(2) obtaining a second solution by separating about 95% of said solvent from said first solution by flash vaporization;
(3) obtaining a third solution by passing said second solution through a catalyst composed of an activated bauxite containing iron oxide for adsorption by said bauxite of all but traces of said contaminants;
(4) removing substantially the balance of said solvent from said third solution by means of stripping steam.

2. The process of removing from used lubricating oil drainings contaminants of the class consisting of the products of cracking and polymerization of the oil and the decomposition products of oil additives including anti oxidants, deactivators, detergents, viscosity index improvers, polar organic rust inhibitors, and pour point depressants which consist of:
(1) obtaining a first solution by passing said drainings through a specific solvent composed of about 90% propane by volume, about 8% butane by volume and about 2% ammonia by volume, said drainings solvent being heated to a temperature of about 100° F. to 170° F. and under pressure of about 400 to 600 pounds per square inch gauge, the ratio of drainings to solvent being about 1:1 to 1:20 for removing by precipitation of 90% of said contaminants;
(2) obtaining a second solution by separating about 95% of said solvent from said first solution by flash vaporization at a temperature of about 250° F. to 500° F. and at a pressure of about 250 to 350 pounds per square inch gauge;
(3) obtaining a third solution by passing said second solution through a catalyst of activated bauxite at about 350° F. to about 700° F. and a pressure of about 0 to 50 pounds per square inch gauge and at a space velocity of solution to catalyst of about 1:2 v./v./hr., said activated bauxite having a particle size in the range of 10–20 mesh and containing iron oxide for adsorption by said bauxite of all but traces of said contaminants;
(4) removing said solvent from said third solution by means of stripping steam.

References Cited by the Examiner
UNITED STATES PATENTS

| | | | |
|---|---|---|---|
| 1,633,941 | 6/27 | Hey | 208—180 |
| 2,070,626 | 2/37 | Shoemaker | 208—180 |
| 2,286,823 | 6/42 | McMillan | 208—33 |
| 2,830,012 | 4/58 | Norris | 208—182 |

ALPHONSO D. SULLIVAN, *Primary Examiner.*